(12) United States Patent
Malaczynski et al.

(10) Patent No.: US 10,026,136 B2
(45) Date of Patent: Jul. 17, 2018

(54) AUTOMATED DISCOUNTING AND NEGOTIATION

(71) Applicants: Peter Malaczynski, Sydney (AU); Corey Johnson, Sydney (AU)

(72) Inventors: Peter Malaczynski, Sydney (AU); Corey Johnson, Sydney (AU)

(73) Assignee: HAGGLE SHOPPING PTY LTD, Sydney (AU)

(*) Notice: Subject to any disclaimer, the term of this patent is extended or adjusted under 35 U.S.C. 154(b) by 755 days.

(21) Appl. No.: 13/840,766

(22) Filed: Mar. 15, 2013

(65) Prior Publication Data

US 2014/0279168 A1   Sep. 18, 2014

(51) Int. Cl.
G06Q 30/00 (2012.01)
G06Q 50/18 (2012.01)
G06Q 30/06 (2012.01)

(52) U.S. Cl.
CPC ....... *G06Q 50/188* (2013.01); *G06Q 30/0611* (2013.01)

(58) Field of Classification Search
CPC .............................. G06Q 30/06; G06Q 30/00
USPC ........... 705/16, 26.1, 27.1, 26.2, 37; 70/26.4
See application file for complete search history.

(56) References Cited

U.S. PATENT DOCUMENTS

| | | | | |
|---|---|---|---|---|
| 6,415,270 B1* | 7/2002 | Rackson | ............... | G06Q 30/02 705/36 R |
| 7,003,486 B1* | 2/2006 | Condamoor | ........... | G06Q 40/04 705/37 |
| 7,257,552 B1* | 8/2007 | Franco | ................... | G06Q 10/08 705/26.2 |
| 7,330,826 B1* | 2/2008 | Porat | ................... | G06Q 30/0601 705/26.3 |
| 7,373,325 B1* | 5/2008 | Hadingham | ........... | G06Q 30/08 705/35 |
| 7,386,476 B1* | 6/2008 | Shavanadan | ........... | G06Q 30/02 705/26.2 |
| 7,676,034 B1* | 3/2010 | Wu | ..................... | H04M 3/5233 379/265.01 |

(Continued)

OTHER PUBLICATIONS eBay Publication, www.archive.org, Jan. 20, 2012, p. 1.*

*Primary Examiner* — Oluseye Iwarere
(74) *Attorney, Agent, or Firm* — Hunton Andrews Kurth LLP (57) ABSTRACT

Embodiments of the present invention provide a system and method for automated negotiation and discounts for consumers and merchants. In an embodiment, an automated system negotiates discounts with each individual consumer, on a one-on-one basis, on behalf of a merchant while continually finding the optimum equilibrium between live supply and demand data. This may be achieved via a discount system utilizing an algorithm that may seek an ideal balance between supply & demand, and may simulate the merchant's price flexibility or urgency to sell merchandise based on one or more campaign criteria and current market conditions. In another embodiment, the system may also automatically negotiate with merchants, on behalf of the consumers, based on live supply and demand data and the consumers' negotiation preferences. In this manner, the entire negotiations process may be automated using incomplete or complete information to benefit both consumers and merchants alike.

21 Claims, 7 Drawing Sheets

Automated Negotiations System

(56) References Cited

U.S. PATENT DOCUMENTS

| | | | | |
|---|---|---|---|---|
| 7,720,708 B1* | 5/2010 | Elkins, II | G06Q 30/0207 | 705/14.1 |
| 8,548,868 B1* | 10/2013 | Lawrence | G06Q 30/0605 | 705/26.2 |
| 8,577,746 B1* | 11/2013 | Milgrom | G06Q 30/08 | 705/26.3 |
| 2002/0013757 A1* | 1/2002 | Bykowsky | G06Q 30/02 | 705/37 |
| 2002/0042752 A1* | 4/2002 | Chaves | G06Q 30/0613 | 705/26.41 |
| 2003/0023540 A2* | 1/2003 | Johnson | G06Q 10/04 | 705/37 |
| 2003/0041007 A1* | 2/2003 | Grey | G06Q 30/08 | 705/37 |
| 2003/0204466 A1* | 10/2003 | Guo | G06Q 30/0611 | 705/37 |
| 2004/0133502 A1* | 7/2004 | Sadre | G06Q 10/06 | 705/37 |
| 2004/0133526 A1* | 7/2004 | Shmueli | G06Q 50/188 | 705/80 |
| 2004/0193528 A1* | 9/2004 | Sadre | G06Q 10/06 | 705/37 |
| 2005/0102215 A1* | 5/2005 | Ausubel | G06Q 20/10 | 705/37 |
| 2007/0011080 A1* | 1/2007 | Jain | G06Q 30/06 | 705/37 |
| 2007/0106593 A1* | 5/2007 | Lin | G06Q 40/04 | 705/37 |
| 2007/0198365 A1* | 8/2007 | Dutta | G06Q 30/0601 | 705/26.1 |
| 2007/0203821 A1* | 8/2007 | DuFour | G06Q 10/08 | 705/37 |
| 2007/0250403 A1* | 10/2007 | Altschuler | G06Q 30/00 | 705/7.34 |
| 2007/0288350 A1* | 12/2007 | Bykowsky | G06Q 30/0273 | 705/37 |
| 2008/0033857 A1* | 2/2008 | Moses | G06Q 20/342 | 705/35 |
| 2008/0059273 A1* | 3/2008 | Miller | G06Q 10/04 | 705/7.31 |
| 2008/0082355 A1* | 4/2008 | Leach | G06Q 30/08 | 705/310 |
| 2010/0063831 A1* | 3/2010 | Rosa | G06Q 30/0201 | 705/1.1 |
| 2010/0205067 A1* | 8/2010 | Gottehrer | G06Q 30/08 | 705/26.1 |
| 2010/0217650 A1* | 8/2010 | Hartnell | G06Q 10/04 | 705/7.29 |
| 2011/0078045 A1* | 3/2011 | Tuflija | G06Q 20/10 | 705/26.64 |
| 2011/0153449 A1* | 6/2011 | Hite | G06Q 30/08 | 705/26.3 |
| 2011/0295722 A1* | 12/2011 | Reisman | G06Q 30/0201 | 705/27.1 |
| 2012/0022965 A1* | 1/2012 | Seergy | G06Q 30/0611 | 705/26.4 |
| 2012/0197722 A1* | 8/2012 | Mesaros | G06Q 30/06 | 705/14.58 |
| 2013/0054388 A1* | 2/2013 | Ergun | G06Q 10/087 | 705/16 |
| 2013/0110652 A1* | 5/2013 | Herring | G06Q 30/06 | 705/16 |
| 2013/0232027 A1* | 9/2013 | Reich | G06Q 30/0631 | 705/26.7 |
| 2013/0282508 A1* | 10/2013 | Oberman | G06Q 30/0605 | 705/26.2 |
| 2014/0244421 A1* | 8/2014 | Porat | G06Q 30/08 | 705/26.3 |

* cited by examiner

FIGURE 1: Automated Negotiations System

FIGURE 2

FIGURE 3 - DETAIL A

FIGURE 4 – Item ~304 Acceptance of Bid Offers Algorithm

ASR = Average Sale Required (Rounded to Nearest Unit)

R = Descending Oder Rank

Figure 7: Purchase Order with Trailer
Trailer with Dynamic Trigger based on Current Price & Complete Information

AUTOMATED DISCOUNTING AND NEGOTIATION

BACKGROUND

The present invention relates to a method and system for automated discounting and negotiation. Negotiation can be a time-consuming exercise. Traditionally, time-consuming negotiations are reserved for the sale of expensive items, such as homes and vehicles, where the potential savings in a larger transaction can offset the time cost associated with negotiations. The inefficiency of negotiation is amplified in retail situations where, typically, large volumes of inventory need to be turned over. Large-scale negotiation in these situations has generally been unsuccessful. Furthermore, many consumers are not familiar, or may be uncomfortable, with the negotiation process. Thus, these consumers may steer away from situations that include negotiating. Therefore, a need exists for an automated method and system for negotiating discounts in a retail environment.

DETAILED DESCRIPTION

Embodiments of the present invention provide a system and method for automated negotiation and discounts for consumers and merchants. In an embodiment, an automated system negotiates discounts with each individual consumer, on a one-on-one basis, on behalf of a merchant while continually finding the optimum equilibrium between live supply and demand data. This may be achieved via a discount system utilizing an algorithm that may seek an ideal balance between supply and demand, and may simulate the merchant's price flexibility or urgency to sell merchandise based on one or more campaign criteria and current market conditions. In another embodiment, the system may also automatically negotiate with merchants, on behalf of the consumers, based on live supply and demand data and the consumers' negotiation preferences. In this manner, the entire negotiations process may be automated using incomplete or complete information to benefit both consumers and merchants alike.

One embodiment includes an automated discounting system of an e-commerce method for selling products or services via a communication network. The negotiated result for each individual sale may be based on a dynamic algorithm where the discounted price is a result of changes to live supply and demand data. A discounting process may automate the merchant decision process of accepting offers based on market changes between live supply and demand data. The automation method may continually vary demand by dynamically altering the discounted release price as needed to match with supply. In this manner, the automation method may remove the need for discount speculation from a seller to achieve a particular sale target. Embodiments of the present application may find application in retail sales of goods or services, online advertising, television or radio advertising, print advertising, and the like.

Figure 1:
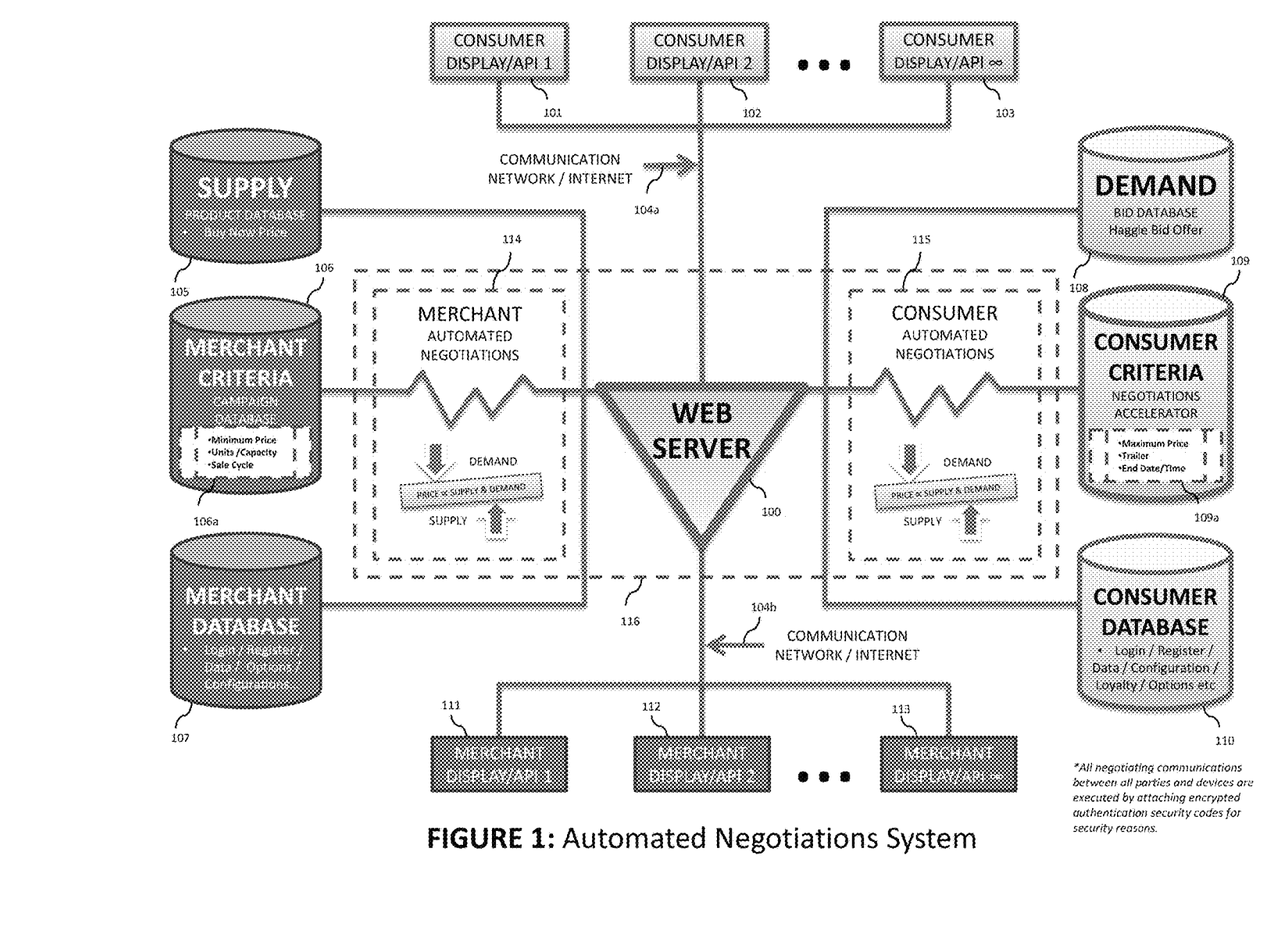
FIG. 1 illustrates an automated negotiation system according to an embodiment of the present invention.

FIG. 1 illustrates a schematic diagram of an automated negotiation system according to an embodiment. As illustrated in FIG. 1, web-server 100 may be connected to a communication network, such as the Internet, via connections 104a and 104b. Connections 104a and 104b may be wired or wireless and may operate using one or more protocols known in the art, such as TCP/IP, WLAN, LAN, and/or Wi-Fi 802.11a-n, for example.

Web server 100 may allow merchants 111, 112, 113 and consumers 101, 102, 103 to negotiate and access the system through the communication network. Consumer displays 101, 102, 103 may be user interfaces, websites, applications, or other software that provides advertisements for products. The advertisements may be incorporated into retail websites listing products for sale, embedded in applications such as mobile applications, or on websites displaying search results, email or other content. The advertisements may provide links for a consumer to purchase via a buy now price or using a haggle bid offer. In addition, the advertisement may include an indication as to an equilibrium price and an indicator, such as an up/down arrow, indicating pricing trends. The equilibrium price may be determined by known and existing terms and calculations, such as the average or mean resale price, the last release price, or price trends. The indicator may be chosen depending on current market conditions that would be more beneficial for the consumer in interpreting the market and thereby making educated and realistic offers.

According to other embodiments of the present invention, the buy now price, based in part on supply data 105, may be a fixed price for which customers can purchase a product or service without a negotiations process. The buy now price, however, may be based upon information obtained from a merchant relating to sales goal, supply data, and demand data. The haggle bid offer, based in part on demand data 108, may be a public or sealed bid as predefined by a merchant for a particular campaign. The haggle bid offer may be a determined starting price to begin automated negotiations.

Web server 100 may include campaign criteria databases 106 and 109, which may be used to determine supply/demand and merchant/consumer price flexibility. The merchant/consumer price flexibility may be automated via a correlation between the campaign criteria inputs and live market supply 105 and demand 108 data. The live market supply may be accurately determined by application programing interfaces (APIs) at the merchant 111, 112, 113 user interfaces. A product database 105 may consist of product information, descriptions, images, reviews and a buy now price 105 that is always displayed to make instant purchases and which may be used as a benchmark for offers. Each product in the product database 105 may include campaign criteria 106a data associated with it. The merchant campaign criteria 106a may be used in the automation process and may include a minimum price, number of units in inventory or capacity, and sale cycle data, such as the number of days a particular item will be offered for sale.

The system may include merchant database 107. Merchant database 107 may contain merchant details such as, but not limited to, business register data, login information, business name and address, preferred method of payment, and negotiation configurations. A consumer database 110 may include consumer details such as but not limited to, login information, name, address, credit card details, shipping address, and loyalty rewards.

The automated negotiations system of FIG. 1 may include an automated negotiations module 116 that may include a merchant discount automation module 114 and a consumer negotiation automation module 115 (both described in further detail below). The module 116 may be used in several configurations, depending on the type of negotiation a consumer is engaging in, and may access the data provided in the merchant database 107 and campaign criteria 106 and the consumer database 110 and campaign criteria 109. Depending on the negotiation configuration, the module 116 may utilize the merchant discount module 114 and the consumer negotiations automation module 115 either alone or in combination. The negotiations configurations are described in more detail later on in the disclosure.

The merchant discount automation module 114 may provide a correlation between variables of campaign criteria 106, supply 105, and demand 108 such that a systematic change in the value of any variable (106, 108, and 109) may be accompanied by the system adjusting the merchant discount automation 114 value. Merchant discount automation module 114 may be implemented as software stored on a computer-readable storage medium, and executed by a processor, for example. The consumer automation module 115 may provide correlation between variables of campaign criteria 109, supply 105, and demand 108 such that a systematic change in the value of any variable (109, 105, and 106) may be accompanied by the system adjusting the consumer negotiation automation 115 value (this algorithm will be described in further detail below).

In the manner described above, server 100 may continually determine the Nash Equilibrium between the merchant and consumer according to market conditions. Nash Equilibrium occurs when each party has chosen a strategy and no party can benefit by changing their strategy while the other parties keep theirs unchanged. The price maintenance discount adjustment drives the automated negotiations to reach a Pareto-efficient result, which is where no further Pareto improvements can be made. In a Pareto efficient economic allocation, no one can be made better off without making at least one individual worse off. Given an initial allocation of goods among a set of individuals, a change to a different allocation that makes at least one individual better off without making any other individual worse off is called a Pareto improvement. An allocation is defined as "Pareto efficient" or "Pareto optimal" when no further Pareto improvements can be made.

The consumer may also have an automated negotiations option via the consumer criteria 109. The consumer criteria 109 may be used by automated negotiations module 115 which may be connected with barcodes (either printed, or displayed on a mobile device, or transmitted from a mobile device), QR codes (either printed, or displayed on a mobile device, or transmitted from a mobile device), and NFC (Near Field Communication) protocols by mobile shoppers using mobile devices. Consumer negotiations module 115 may be implemented as software stored on a computer-readable storage medium, and executed by a processor, for example. Consumer criteria 109, which may contain negotiations accelerator data 109a, operates on one or more variables required for automation. For example, negotiations accelerator data 109a may include data such as maximum price, trailer data (described in further detail below with respect to FIG. 7), and end date or time. All negotiating communications between all parties and devices may be executed by attaching encrypted authentication security codes, or other security protocols known in the art.

The automation decision process in which offers are accepted is determined by an algorithm (described in FIG. 3) executed by a processor, which may interpret market conditions by looking at demand, sales and merchant campaign criteria. The general premise that determines the cost actually charged may be that while a higher offer will be considered before a lower bid offer, the actual price that the winning bidder will pay is the next highest offer plus a nominal value, such as $0.01. In this manner, the phenomenon known as the 'winners curse,' where the inefficiency associated with winning an auction leads the winner to have overpaid in order to win by outbidding their competitor may be reduced.

Embodiments of the present invention may utilize various algorithms for automated negotiation (described in detail below with respect to FIGS. 2-7). The algorithms may be comprised of software instruction stored on a computer-readable storage medium, and executed by a particular machine, such as a processor within web server 100. The algorithms may represent back and forth automated negotiations that may be part of a negotiations cycle. A negotiations cycle includes offers and counter-offers between merchants and consumers, including an automated negotiations accelerator. The automated counter-offer may be a return offer, which may be made in response to a previous offer by any party during the counter-offer negotiations cycle. This may be done via an automated negotiation system that responds by considering the previous offers and current market conditions. Responding with a counter-offer may allow a person to decline on a previous offer, while allowing negotiations to continue, for example.

According to embodiments of the present invention, the negotiation system in FIG. 1 may cover a number of possible configurations, including manual or automated options, wherein a number of algorithms may be used within each individual configuration. Consumer negotiations/purchase configurations may be made available by the merchant or chosen by the consumer. The configuration may be either based on incomplete or complete information (described in further detail below). The possible configurations may include automated negotiations on one side (merchant side), automated negotiations on both sides, and delegated purchase order (by the consumer).

Each negotiation configuration may be based on complete or incomplete information. Incomplete information on both sides means that merchant's automation criteria and the consumer's automation criteria are not shared between opposing parties in the negotiation. In order to serve both sides with incomplete information, a time delay may be programmed into the negotiations process based on urgency criteria entered by either party. Complete information means that a negotiation is conducted by a trusted third party that may have access to merchant criteria, consumer criteria, and the market data. In such circumstances, the negotiations may be instantaneous because the trusted third party may know both sides' position and the current market conditions.

An automated negotiation on the merchant side with manual negotiations on the consumer side may be based on incomplete information because the parties to the negotiation do not have access to each other's negotiation criteria (106 and 109). In this configuration, the negotiations module 116 may utilize the merchant discount automation module 114 and not the consumer automated negotiations module 115.

An automated negotiation on both sides may be based on either incomplete or complete information, depending on the consumers' preference. According to this configuration, the negotiations module 116 may utilize both the merchant discount automation module 114 and the consumer automated negotiations module 115. In an automated negotiation with incomplete information, the system may automatically negotiate for the consumer and the merchant based on their respective criteria 109 and 106. However, the consumer and merchant negotiation criteria in an automated negotiation with incomplete information are not shared. In this case, the system is essentially automating the consumer's negotiation process. In contrast, an automated negotiation on both sides with complete information allows the system to conduct the negotiation with all of the criteria provided by the consumer and the merchant, to reach the optimum sale for both parties.

Each automated negotiation configuration above may also be done by a delegated agent on behalf of the consumer. In that case, the delegated authority may have the authority to execute a sale on the consumer's behalf and notify the consumer when the sale is complete.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
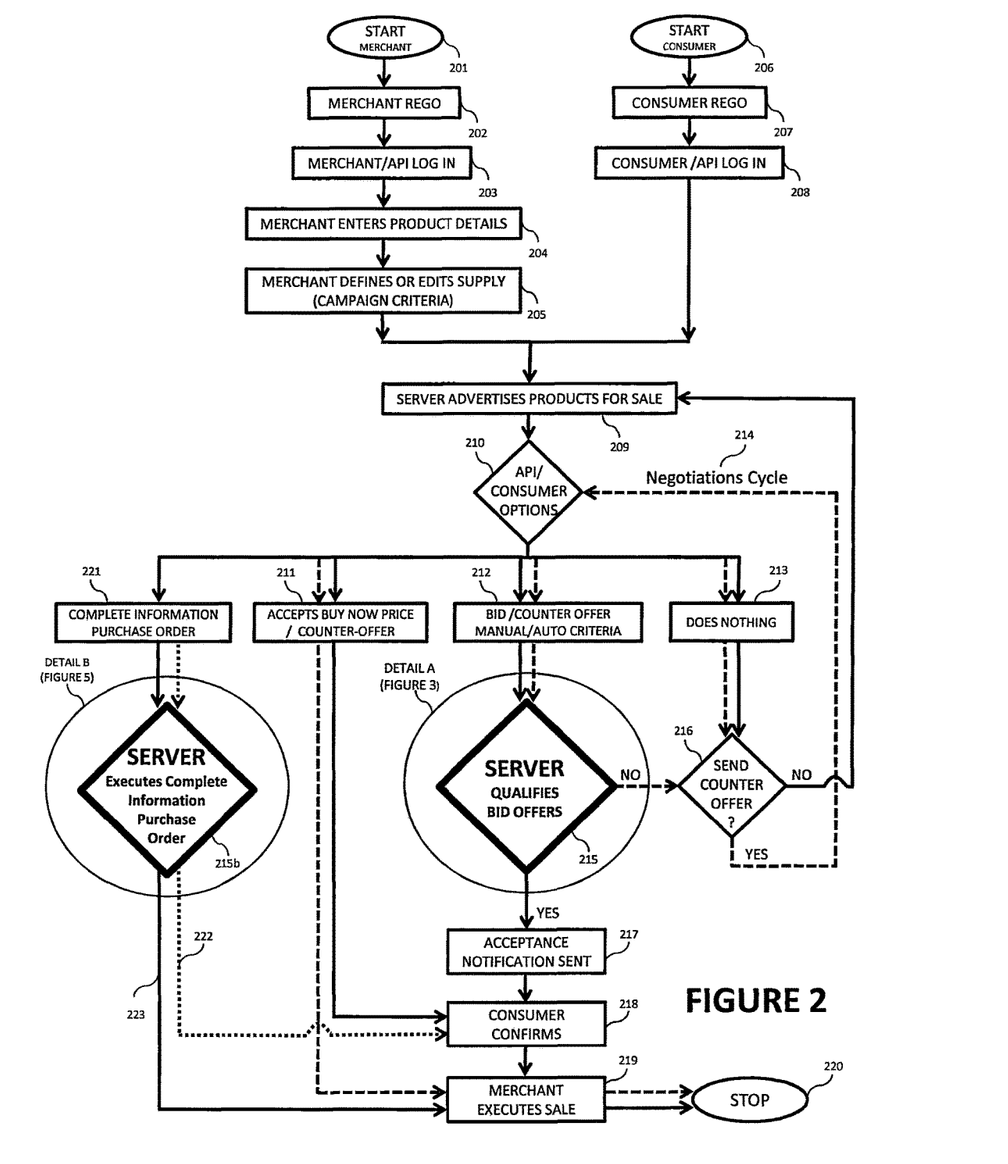
FIG. 2 illustrates an algorithm for automated negotiation according to an embodiment of the present invention.

FIG. 2 illustrates and algorithm for an automated negotiation in the system of FIG. 1 according to an embodiment of the present invention. As illustrated in FIG. 2, step 201 corresponds to a merchant logic flow and step 206 corresponds to a consumer logic flow. Prior to the commencement of a negotiation, merchants and consumers may register (steps 202 and 207, respectively) with the web server 100 so that their information may be stored in databases 107 and 110, respectively. The merchant database 107 may contain merchant details such as, but not limited to, business register data, business name and address, and preferred method of payment. The consumer database 110 may include consumer details such as but not limited to, name, address, credit card details, shipping address, and loyalty rewards. Once registered, merchants and customers may log into system in steps 203 and 208, respectively. The log in procedures may be required before negotiations can commence, unless on an identifiable universal wallet device (e.g. NFC), which may be present on a portable electronic device.

At step 204, the merchant may enter product details, which may include but are not limited to product information, descriptions, images, reviews and a buy now price. Product details may be stored in a database, such as product database 105.

At step 205, the merchant may define or edit supply or campaign criteria, such as a minimum price, retail price, number of units in inventory or capacity, and sale cycle data, such as the number of days a particular item will be offered for sale. At this point, the web-server 100 may check and qualify any change in the merchant campaign. At step 209, the server 100 may advertise products for sale that are accessible to consumers via the communication network/internet 104a. The advertisements may be incorporated into retail websites listing products for sale, embedded in applications such as mobile applications, or on websites displaying search results, email or other content. The advertisements may provide links for a consumer to purchase via a buy now price 105 and a haggle bid offer 108, as shown in FIG. 1.

At step 210, the consumer options may be displayed. A consumer may be presented with one or more options including, but not limited to, a complete information purchase order (step 221), acceptance of the buy now price (step 211), a bid or counter offer (i.e., manual negotiations) (step 212), engage in an automated negotiation (described in further detail below), or do nothing and wait. At step 211, the consumer may be 'one-click' away from finalizing the purchase. Alternatively, the consumer may cease negotiations (step 213) and play a waiting game based on a previous offer as he or she waits for market conditions to turn in his or her favor.

If a consumer decides to engage in a complete information purchase order (step 221), the server may execute a complete information purchase order at step 215b (this process is described in FIG. 5 below). Next, depending on the result of the purchase order, the server may either ask (222) for the consumer's confirmation (at step 218) or execute (223) the sale (step 219).

If a consumer accepts a buy now price (or a counter-offer), the consumer may confirm the purchase (step 218), after which the merchant executes a sale (step 219), which ends negotiations. If the consumer decides to manually negotiate, a bid/counter-offer may be entered (step 212), and the server 100 may begin the qualification process of qualifying acceptable bids and or sending counter offer for the server (step 215; this algorithm is described in FIG. 3 below). The server 100 may respond to bid/counter-offer with a 'yes' or 'no' response. If 'no,' the server 100 may make a decision whether to send or not to send a counter-offer (step 216). This process continues until a bid is qualified by the web-server 100 (step 215) or the consumer accepts a counter-offer (step 211). If a bid/counter-offer is accepted at step 215, the merchant may send an acceptance notification to the consumer (step 217). The consumer may confirm the purchase (step 218), and the merchant may subsequently execute a sale (step 219) and stop the negotiation (step 220). The merchant may execute the sale by server 100 automatically allowing a consumer to proceed with a checkout process, for example.

If the consumer elects to do an automated negotiation (where negotiation is done automatically on the merchant and the consumer side), the consumer may enter campaign criteria (such as maximum price, trailer data, and negotiations end date/time 109a) into negotiations accelerator 109. In this manner, the manual negotiations process above may be done automatically based on the consumer's preferences.

Figure 3:
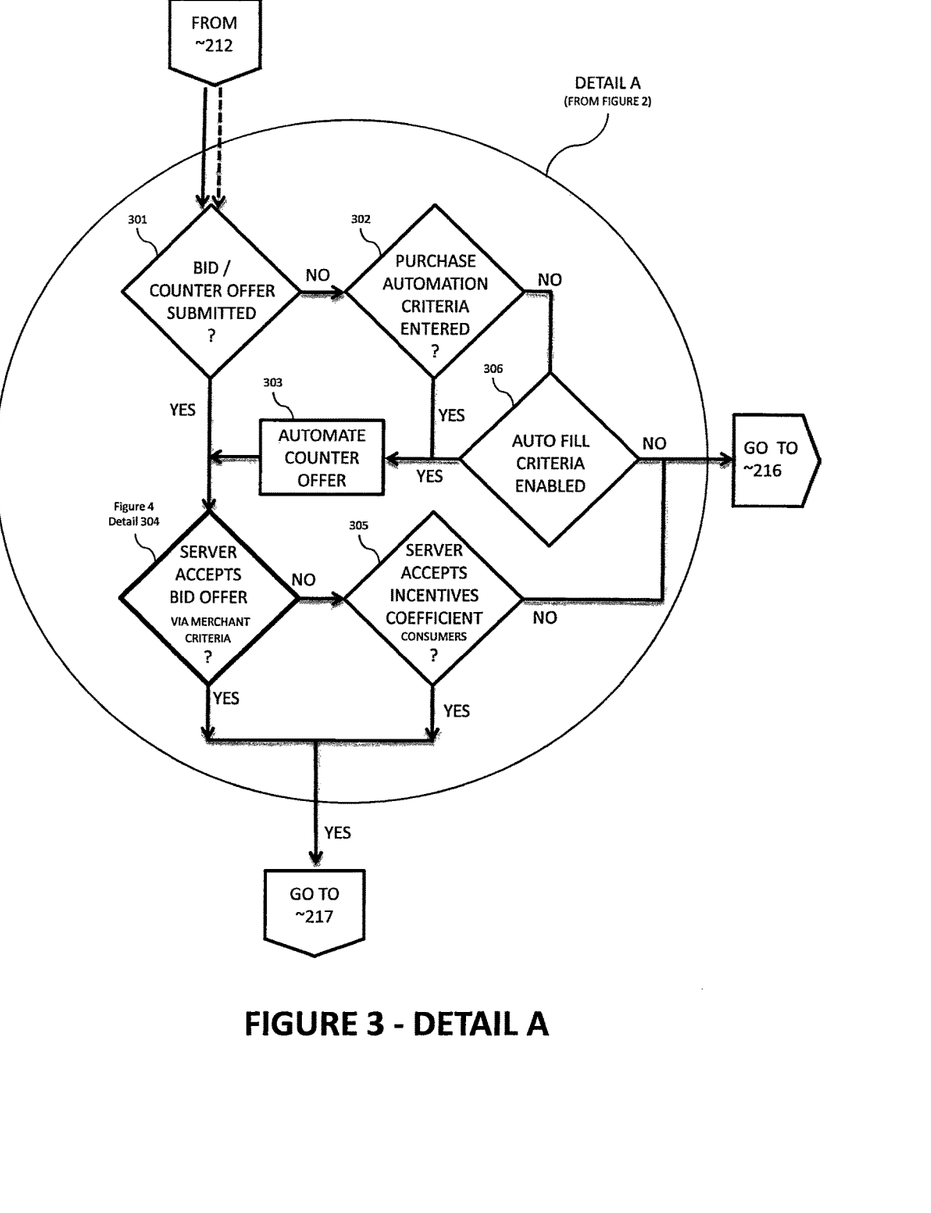
FIG. 3 illustrates an algorithm for automated negotiation according to an embodiment of the present invention.

FIG. 3 illustrates an algorithm for automated negotiation based on incomplete information according to an embodiment of the present invention. In particular, FIG. 3 illustrates the process by which the negotiations module 116 (hereinafter referred to as the "server"), using automated negotiations modules 114 and 115 of FIG. 1, qualifies bid offers. At step 301, the server may determine whether or not a bid or counter offer has been submitted. If 'yes,' server may determine whether to accept the bid offer via merchant criteria in step 304. If the server accepts (this process will be described in FIG. 4 below), it may send an acceptance notification to a consumer via email, phone, text messaging, social networking, or other means known in the art (step 217 in FIG. 2). If the bid/offer is not submitted and if merchant criteria was entered (step 302), the server may automate a counter offer (step 303) on behalf of the consumer, which is then accessed at step 304, where the server may accept the counter offer via merchant criteria. If no purchase automation criteria have been entered (at step 302), the server may check if the consumer enabled auto fill criteria, which may give the server the authority to auto fill campaign criteria on their behalf based on market conditions and supply/demand data (step 306). If 'no,' the server may determine whether or not to send a counter offer (step 216 in FIG. 2). If 'yes,' the server may automate a counter offer for the consumer (step 303).

If the server rejects the consumers bid offer (at step 304) or counter offer (based on the merchants criteria and current market conditions) the server may reconsider the offer by checking the consumer incentive coefficient at step 305 (loyalty and rewards program), if it can still qualify their internally rejected offer. If 'no,' the server may determine whether or not to send a counter offer based on the merchant criteria (step 216 in FIG. 2). If 'yes,' the server may send an acceptance notification to the consumer (step 217 in FIG. 2).

Figure 4:
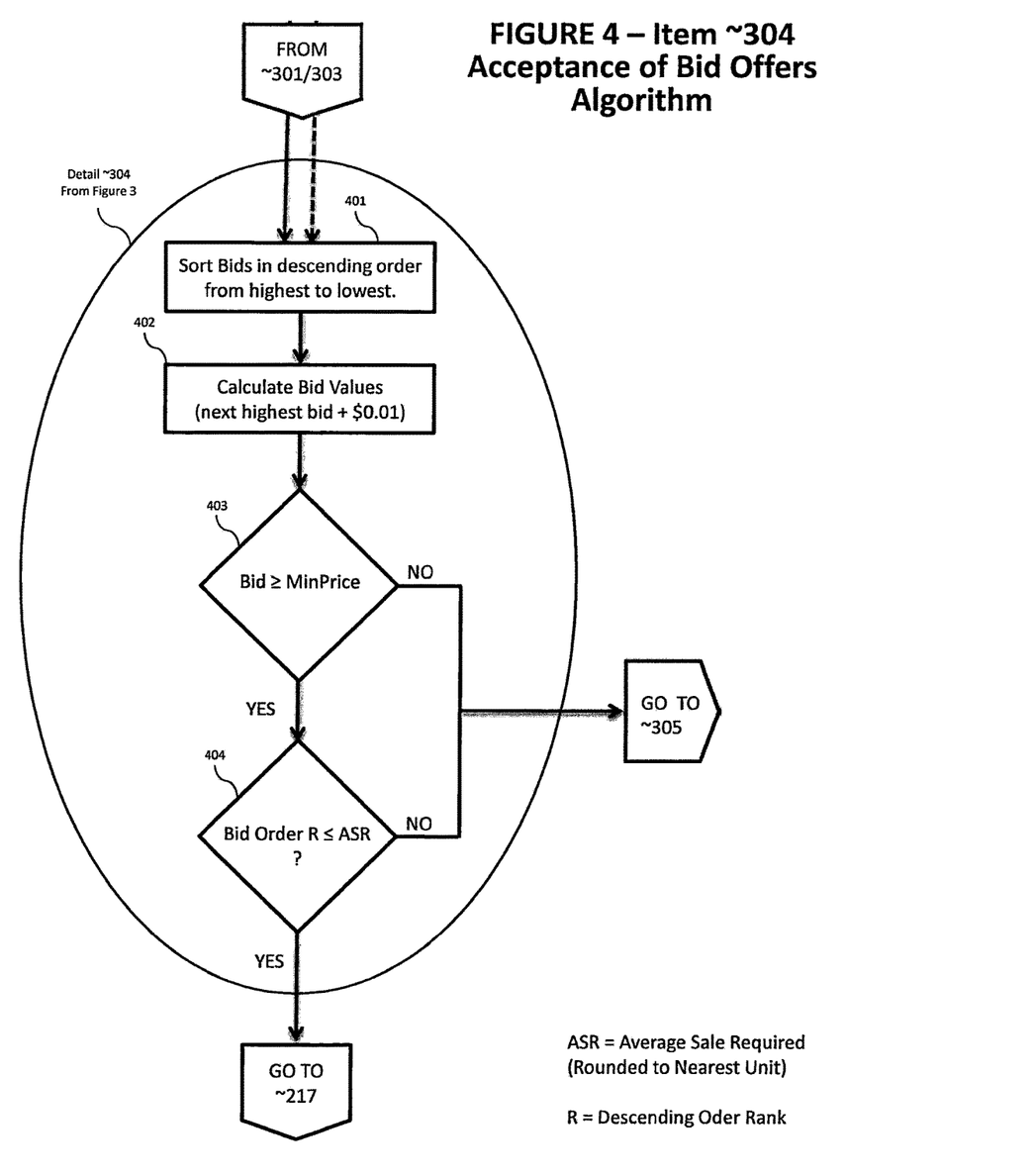
FIG. 4 illustrates an algorithm for automated negotiation according to an embodiment of the present invention.

FIG. 4 illustrates an algorithm detailing how a server, on the merchant's behalf, may decide whether to accept or reject a bid/counter offer by a consumer (step 304 in FIG. 3). The server may progress through the algorithm based on campaign criteria provided by the merchant. The criteria may include a buy it now price, a minimum price, the stock of the product for sale, and the number of days the product will be on sale. The buy it now price may be a price at which the server will automatically accept. The minimum price may be the lowest price that the merchant is willing to sell the item for. The stock of the product and the days the item is for sale may indicate how many units of a particular item the merchant intends on selling per day. For example, if there are thirty-five units of a given item in stock and the number of days the item is on sale is seven, the merchant may require that five units are sold per day (called the average sale required, ASR). The ASR value determines whether certain bids are accepted or rejected, as described below.

The server may initially sort (or assign a rank to) the bids for a given advertisement in descending order from highest to lowest in step 401 and calculate bid values (next highest bid+$0.01) in step 402. The server may subsequently determine whether the bid/counter offer at issue is greater than or equal to the minimum price set in the merchant criteria in step 403. If the bid/counter offer is lower than the minimum price, the server may proceed to step 305 of FIG. 3 (described above). If the bid/counter offer is greater than or equal to the minimum price, the server may determine whether the bid/counter offer's rank (R) is less than or equal to the average sales required (ASR) value (step 404). If the rank R is greater than the ASR (meaning that the units sold per day requirement is met for the day in question), the server may reject the bid/counter offer and proceed to step 305 in FIG. 3 (described above). If the rank R is less than or equal to the ASR (meaning that the units sold per day requirement is not met for the day in question), the server may go to step 217 of FIG. 2 (i.e., notify the consumer of the acceptance). In this manner, the server may determine whether to accept/reject a bid/counter offer for each day an item is on sale.

Figure 5:
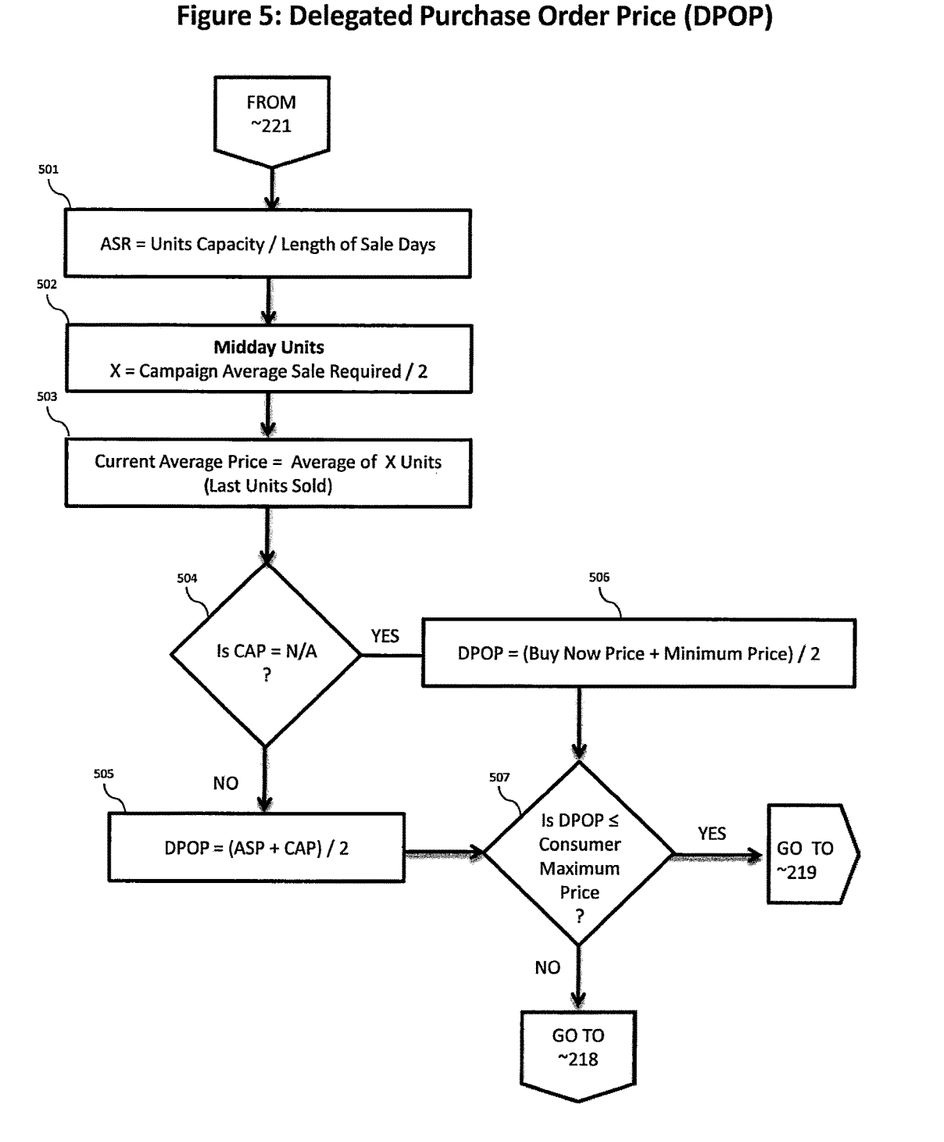
FIG. 5 illustrates an algorithm for automated negotiation according to an embodiment of the present invention.

FIG. 5 illustrates an automated algorithm for a delegated purchase order based on complete information according to an embodiment of the present invention (i.e., describing the operation of step 215*b* of FIG. 2). In this configuration, the consumer may allow a delegated third party to automatically conduct a negotiation on his/her behalf based on the consumer campaign criteria. In step 501, the server may calculate the ASR for a given item as described above. Next, for a given day in a negotiation period, the server may calculate the number of midday units X, which may be equal to the ASR value divided by two (step 502). The server may then calculate a current average price (CAP) of the midday units X (i.e., the last units sold) in step 503. If the server is able to calculate the CAP, the algorithm may proceed to step 505, where the server sets the delegated purchase order price (DPOP) equal to the sum of the average sale price during the course of the entire negotiation so far and the current average price, divided by two. The server may then proceed to step 507 (described below).

If the server is unable to calculate the CAP (e.g., there have been no units sold), the server may calculate the DPOP by dividing the sum of the buy it now price (in the merchant campaign database) and the minimum price (in the consumer campaign database) by two in step 506. The server may then determine, at step 507, if the DPOP is less than or equal to the consumer maximum price. If 'yes' (i.e., the determined DPOP is acceptable to the consumer based on the consumer's campaign criteria), the server may execute the sale on behalf of the merchant (step 219 of FIG. 2). If 'no' (i.e., the determined DPOP is above what the consumer initially said he/she was willing to pay) the agent may ask the consumer if the DPOP is suitable based on current market conditions (step 218 of FIG. 2). According to embodiments of the present invention, the delegated purchase order price algorithm described above may be executed by an agent, in response to a consumer's input (i.e., "one time criteria submission") at a user interface (e.g., one-click of a computer mouse or user interface element).

The algorithm described in FIG. 5 may optionally employ a trailer coefficient to prevent the agent from offering an unfavorable price during a temporary unfavorable price movement. The purpose of a trailer may be to automate the negotiations process on the consumer side to not only buy (or make an offer) when the consumer's criteria is met, but to try to buy as low as possible. The trailing buffer (or trailing value) is used to execute an automated market decision (bid) based on the overall trend of the market price and not on a temporary fluctuation of the market price (volatility). Thus, the trailers may give a consumer a chance of receiving a greater discount. In theory, the trailer should be beyond the current market (price) volatility for a given item to prevent offers from being made during temporary volatility in the price movement for an item. An embodiment of the present invention using a trailer with a dynamic trigger is described in further detail in FIG. 7 below.

Figure 6:
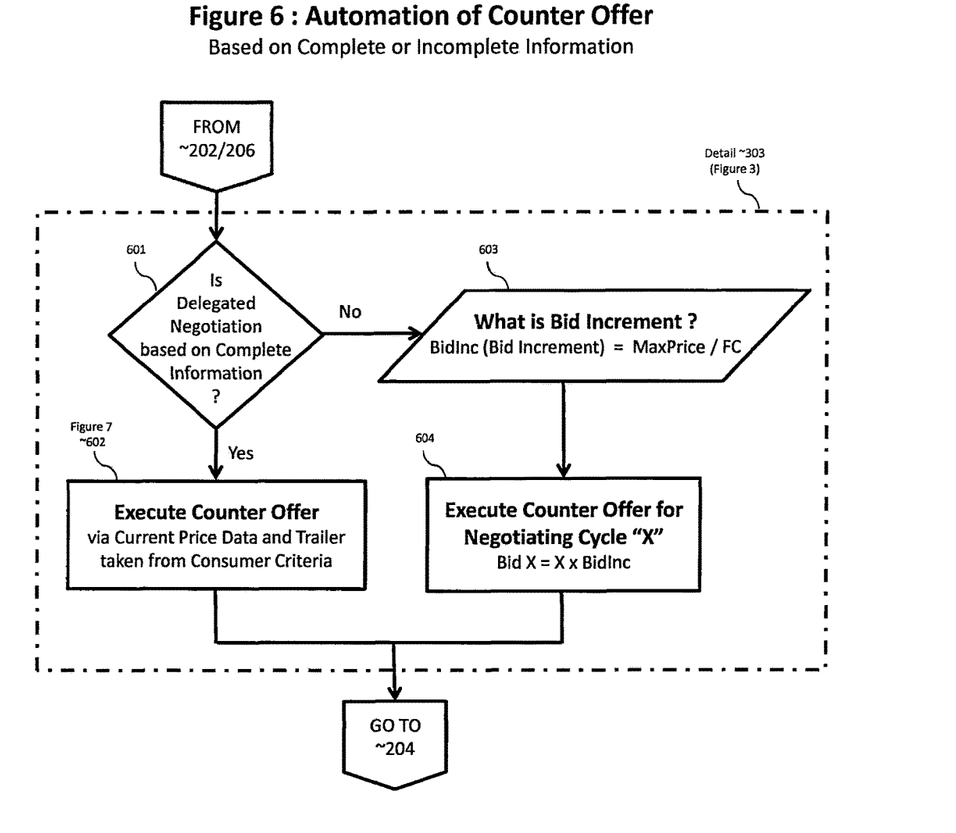
FIG. 6 illustrates an algorithm for automated negotiation according to an embodiment of the present invention.

FIG. 6 illustrates an algorithm detailing how a server may automatically determine a counter offer for a consumer with either complete or incomplete information (step 303 in FIG. 3). The server may initially determine whether the delegated negotiation is based on complete or incomplete information (step 601). If the negotiation is based on complete information, the server may execute a counter offer via current price data and trailer data taken from the consumer criteria at step 602 (described in further detail below in FIG. 7).

If the negotiation is not based on complete information, the server may determine the bid increment based on the consumer's campaign criteria (step 603). Specifically, the bid increment may be equal to the max price the consumer is willing to pay divided by the length of the negotiation (or the frequency consumer, FC). For example, if the max price listed by the consumer is $100 and the length of the negotiation is four days, the bid increment may be $25.

Next, the server may execute the counter offer for a given negotiations cycle "X" by multiplying the number of the current negotiations cycle X by the bid increment (step 604). Continuing with the example above, the bids may be in the following increments (according to the equation in step 404): $25, $50, $75, and $100 (if the negotiation makes it to day four in the negotiation cycle). According to embodiments of the present invention, the server may apply scaling factors (a multiplier) if the length of a negotiation is low. For example, if FC is only one day, twenty-four hour time frame bid increments may be applied for better consumer results. Once the counter offer is determined, the server may move on to step 204 of FIG. 2.

Figure 7:
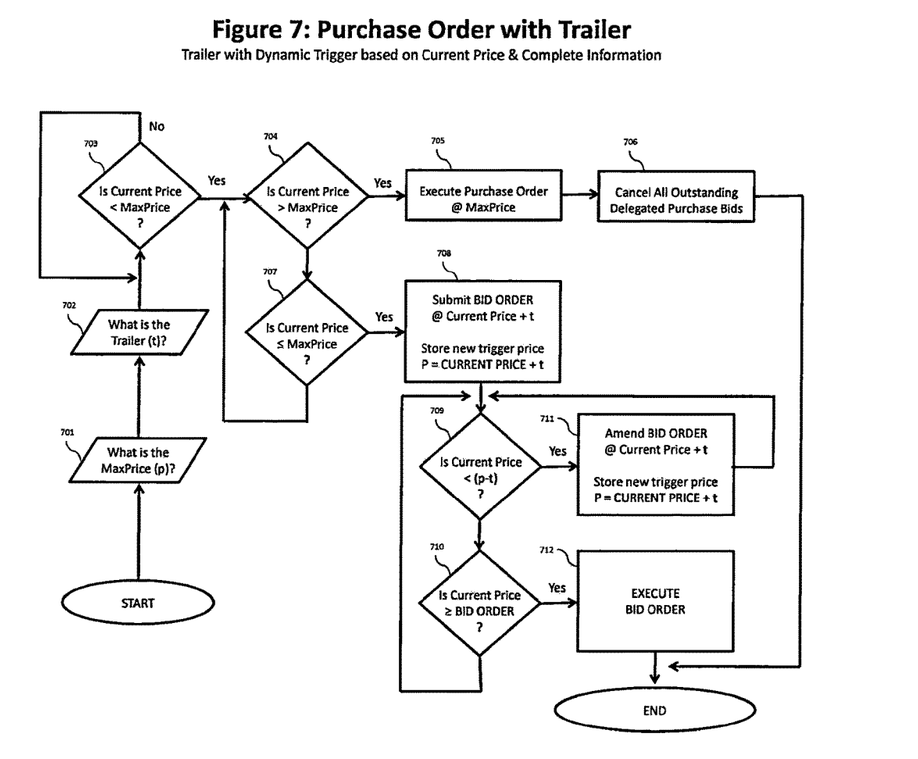
FIG. 7 illustrates an algorithm for automated negotiation according to an embodiment of the present invention.

FIG. 7 illustrates an algorithm for utilizing a trailer with a dynamic trigger during an automated purchase order negotiation according to embodiments of the present invention (i.e., describing the operation of 602 of FIG. 6). In steps 701 and 702, the server may load the max price (p) and the trailer (t) value from the consumer campaign criteria. At step 703, the server may determine whether the current price of an item for sale is less than the max price. If 'no,' the server keeps comparing the prices until the current price is below the max price. At step 704, the server may determine whether the current sale price is greater than the max price. If 'yes,' the server may execute the purchase order at the max price (step 705) and cancel all outstanding delegated purchase bids (step 706). If 'no,' the server may move to step 707 and determine whether the current price is less than or equal to the max price. If 'no,' the server may return to step 704. If 'yes,' the server, at step 708, may submit a bid order at the current price plus the trailer value (t). During this step, the server may store a new trigger price P as the current price plus the trailer value. At step 709, the server may determine whether the current price is less than the max price minus the trailer. If 'yes,' the server may amend the bid order to the current price plus the trailer value (step 711), store the new trigger price as the current price plus the trigger value, and return to step 709. If 'no,' the server may determine whether the current price is greater than or equal to the bid order at step 710. If 'no,' the server may return to step 709. If 'yes,' the server may execute the bid order at step 712.

Some embodiments of the present invention may be implemented, for example, using a machine-readable medium or article, which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Embodiments of the present invention may also be implemented in processors utilizing nanotechnology. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language. Further, embodiments of the present invention may utilize human deoxyribonucleic acid (DNA), which is capable of carrying data, for security purposes in negotiations. For example, human DNA may be used for NFC security and identification purposes.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

We claim:

1. A system for automatically conducting negotiations, the system comprising:
a server including a processor configured to:
access merchant campaign data for a product or service to be sold and access consumer campaign data that includes a limit for the product or service, wherein the merchant campaign data is supplied to the server by a merchant display user interface through a first communication network and includes a buy now price, wherein the consumer campaign data is supplied to the server by a consumer display user interface through a second communication network, and wherein the consumer display user interface displays a first option to execute a sale at the buy now price and a second option to execute an automated negotiation; and
responsive to selection of the second option:
automatically conduct a negotiation between a merchant and a consumer over a plurality of negotiation cycles in which the processor automatically increments a consumer bid, using an automated negotiation module by which the processor arrives at a Pareto efficient purchase price for the merchant and the consumer based on supply data, demand data, the merchant campaign data, and the consumer campaign data, wherein the processor arrives at the Pareto efficient purchase price based on:
a ratio of (i) a number of units of the product or service available for sale to (ii) a number of days the product or service is to be sold,
a ranking of the consumer bid for the product or service to be sold among all consumer bids for the product or service to be sold, and a condition that the ranking of the consumer bid must be less than or equal to the ratio;
send the Pareto efficient purchase price to the consumer display user interface as a counteroffer; and
responsive to consumer confirmation of the counteroffer, execute a sale at the Pareto efficient purchase price.

2. The system of claim 1, wherein the automated negotiations module relies on incomplete information to arrive at the Pareto efficient purchase price.

3. The system of claim 1, wherein the automated negotiations module relies on complete information to arrive at the Pareto efficient purchase price.

4. The system of claim 1, wherein the consumer delegates a negotiation authority to a trusted third party to conduct the negotiation based on the consumer campaign data.

5. The system of claim 1, wherein:
the merchant campaign data includes one or more of a minimum price for the product or service, the number of units of the product or service available for sale, and the number of days the product or service is to be sold; and
the consumer campaign data includes one or more of a maximum for the product or service, trailer data, and an end date or time of the negotiation.

6. The system of claim 1, wherein the consumer campaign data includes a trailer value which acts as a buffer to prevent the automated negotiations module from making undesired offers during volatility in the price of the product or service being sold.

7. The system of claim 1, wherein the server conducts the negotiation in response to selection of the second option at the consumer display user interface.

8. The system of claim 1, wherein the processor arrives at the Pareto efficient purchase price by obtaining a relevant number of units by dividing the ratio by two, and determining an average price of the last relevant number of units to have been sold.

9. The system of claim 8, wherein the processor sets the Pareto efficient purchase price as equal to an average of (a) the average price of the last relevant number of units to have been sold and (b) an average price of units sold during a predetermined period.

10. The system of claim 1, wherein the automated negotiations module is executed based on a code received from a mobile device of the consumer.

11. The system of claim 10, wherein the code is received via a Near Field Communications (NFC) protocol.

12. The system of claim 10, wherein the code is a barcode.

13. The system of claim 10, wherein the code is a QR code.

14. The system of claim 1, wherein the automated negotiations module is executed based on a display of a code by a mobile device of the consumer.

15. A computer-implemented method for automatically conducting negotiations, the method comprising:
accessing, by a computer processor of a server, merchant campaign data for a product or service being sold, wherein the merchant campaign data is supplied to the server by a merchant display user interface through a first communication network and includes a buy now price;
accessing, by the processor, consumer campaign data that includes a limit for the product or service, wherein the consumer campaign data is supplied to the server by a consumer display user interface through a second communication network, and wherein the consumer display user interface displays a first option to execute a sale at the buy now price and a second option to execute an automated negotiation; and
responsive to selection of the second option:
automatically conducting, by the processor, a negotiation between a merchant and a consumer over a plurality of negotiation cycles in which the processor automatically increments a consumer bid, using an automated negotiation module by which the processor arrives at a Pareto efficient purchase price for the merchant and the consumer based on supply data, demand data, the merchant campaign data, and the consumer campaign data, wherein the processor arrives at the Pareto efficient purchase price based on:
a ratio of (i) a number of units of the product or service available for sale to (ii) a number of days the product or service is to be sold,
a ranking of the consumer bid for the product or service to be sold among all consumer bids for the product or service to be sold, and
a condition that the ranking of the consumer bid must be less than or equal to the ratio;
sending, by the processor, the Pareto efficient purchase price to the consumer display user interface as a counteroffer; and
responsive to consumer confirmation of the counteroffer, executing, by the processor, a sale at the Pareto efficient purchase price.

16. The computer-implemented method of claim 15, wherein the merchant campaign data includes one or more of a minimum price for the product or service, the number of units of the product or service available for sale, and the number of days the product or service is to be sold.

17. The computer-implemented method of claim 15, wherein the demand data is generated using one or more offers for the product or service received at the server.

18. The system of claim 1, wherein the demand data is generated using one or more offers for the product or service received at the server.

19. An article of manufacture comprising a non-transitory computer-readable storage medium storing instructions that are executable by a processor of a server and that, when executed by the processor, cause the processor to perform a method for automatically responding to offers conducting negotiations, the method comprising:
accessing merchant campaign data for a product or service being sold, wherein the merchant campaign data is supplied to the server by a merchant display user interface through a first communication network and includes a buy now price;
accessing consumer campaign data that includes a limit for the product or service, wherein the consumer campaign data is supplied to the server by a consumer display user interface through a second communication network, and wherein the consumer display user interface displays a first option to execute a sale at the buy now price and a second option to execute an automated negotiation; and
responsive to selection of the second option:
automatically conducting a negotiation between a merchant and a consumer over a plurality of negotiation cycles in which the processor automatically increments a consumer bid, using an automated negotiation module by which the processor arrives at a Pareto efficient purchase price for the merchant and the consumer based on supply data, demand data, the merchant campaign data, and the consumer campaign data, wherein the processor arrives at the Pareto efficient purchase price based on:
- a ratio of (i) a number of units of the product or service available for sale to (ii) a number of days the product or service is to be sold,
- a ranking of the consumer bid for the product or service to be sold among all consumer bids for the product or service to be sold, and
- a condition that the ranking of the consumer bid must be less than or equal to the ratio;

sending, by the processor, the Pareto efficient purchase price to the consumer display user interface as a counteroffer; and responsive to consumer confirmation of the counteroffer, executing, by the processor, a sale at the Pareto efficient purchase price.

20. The article of manufacture of claim 19, wherein the merchant campaign data includes one or more of a minimum price for the product or service, the number of units of the product or service available for sale, and the number of days the product or service is to be sold.

21. The article of manufacture of claim 19, wherein the demand data is generated using one or more offers for the product or service received at the server.

* * * * *